United States Patent [19]

Miserentino et al.

[11] 4,171,645
[45] Oct. 23, 1979

[54] DISPLACEMENT PROBES WITH SELF-CONTAINED EXCITING MEDIUM

[75] Inventors: Robert Miserentino, Hampton; Bruce Flagge, Yorktown, both of Va.

[73] Assignee: The United States of America as represented by the Administrator, of The National Aeronautics and Space Administration, Washington, D.C.

[21] Appl. No.: 928,129

[22] Filed: Jul. 26, 1978

[51] Int. Cl.² .............................................. G01H 9/00
[52] U.S. Cl. ...................................... 73/655; 73/661
[58] Field of Search .............................. 73/655–658, 73/661, 583, 649

[56] References Cited

U.S. PATENT DOCUMENTS

| | | | |
|---|---|---|---|
| 1,591,612 | 7/1926 | Dickinson | 73/655 |
| 2,406,982 | 9/1946 | Zworykin et al. | 73/661 |
| 3,477,280 | 11/1969 | Blackmer | 73/661 |
| 3,905,224 | 9/1975 | Himmler et al. | 73/655 |

*Primary Examiner*—James J. Gill
*Attorney, Agent, or Firm*—William H. King; John R. Manning; Howard J. Osborn

[57] ABSTRACT

A transducer that combines a noncontacting displacement probe with a self-contained target. The target is held in position against a vibrating surface by a housing which also supports the noncontacting probe. The target vibrates with the surface and the probe senses the vibrations of the target.

7 Claims, 5 Drawing Figures

DISPLACEMENT PROBES WITH SELF-CONTAINED EXCITING MEDIUM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

This invention relates to a device for measuring the displacement of a vibrating surface and in particular to a device that can measure the vibration of a nonhomogeneous surface.

DESCRIPTION OF THE PRIOR ART

Certain characteristics of a structure, such as total strength and susceptability to flutter in a windstream, can be predicted by agitating the structure and measuring the vibrations thereof. Noncontacting probes have been used to measure vibrations at a point on the surface. These probes incorporate the surface of the vibrating object as part of the transducer. For example, a fotonic sensor emits light which is reflected by the vibrating object, the intensity of the reflected light is detected by the sensor. The distance between the sensor and the object can be determined from the intensity of the reflected light. The reflective properties of the surface therefore become important when a fotonic sensor is used. Once the reflective properties of a point on the surface are known the probe can measure its distance from that point very accurately.

Servo systems have been designed to move the probe across the surface of the vibrating object. This works well if the surface is homogeneous; but if the properties of the surface change over its area or if the noncontacting probe used does not respond to the surface, the probe fails. The affixation of targets to the surface overcomes the nonresponsive probe problem for a selected point on the surface but is not convenient if the entire surface must be covered. Another problem is that there are surfaces to which a target may not be attached. For instance, the ceramic surface of the space shuttle wing tears when the target is removed. It is also inconvenient to apply the targets to certain structures such as those of honeycomb configuration which do not present an appropriate surface area.

It is therefore an object of the present invention to provide an apparatus that uses a noncontacting displacement probe to measure the vibration of non-homogeneous surfaces without necessitating the attachment of targets thereto.

It is an additional object of the present invention to provide an apparatus that uses a fotonic sensing probe to measure the vibration of surfaces regardless of the reflectivity thereof.

It is a further object of the present invention to provide an apparatus that uses a noncontacting electrical probe to measure the vibration of surfaces regardless of the electrical conductivity thereof.

The foregoing and other objects as well as the advantages attendant therewith will become apparent when the claims and description contained herein are considered in conjunction with the attached drawings to which they relate.

SUMMARY OF THE INVENTION

In the present invention noncontacting displacement probes are equipped with self-contained targets. The target is put in contact with a surface whose vibration it is desired to measure. In one embodiment of the invention gravity holds the target against the vibrating surface. In other embodiments various devices are employed to hold the target against the vibrating surface including: a set of springs, an elastic component similar to a balloon, and a jet spray of gas. In all cases the target vibrates with the surface and the probe measures the vibration of the target. A servo system that carries the apparatus along the entire vibrating surface is also employed. The system uses a feedback control to position the apparatus a constant height above the surface as it transports the device across the surface.

DETAILED DESCRIPTION OF THE INVENTION

Figure 1:
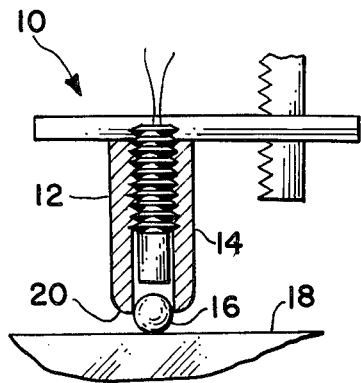
FIG. 1 is an elevational view depicting a cylindrical housing and a spherical target.

As displayed in FIG. 1 the invention basically consists of a non-contacting probe 12 supported by housing 14 and a target 16 that vibrates with vibrating surface 18. Target 16 is maintained in position by housing 14. The entire device is designated generally as transducer 10.

In one embodiment of the invention housing 14 consists of a cylindrical member and target 16 is a ball having a diameter slightly less than the inner diameter of housing 14. Ball 16 has free vertical mobility within housing 14 and can roll therewithin. Housing 14 is tapered at its end 20 to prevent ball 16 from falling out. Probe 12 is sensitive to the vibrations of ball 16. Probe 12 may be a fotonic sensor in which case ball 16 would be a uniformly reflective object or probe 12 may be an electrical sensor that is sensitive to metal such as that described in U.S. Pat. No. 2,802,178 issued to Shafer et al, in which case ball 16 would be constructed of steel. Any type of noncontacting probe may be used so long as the target selected is something to which the probe is sensitive.

Figure 2:
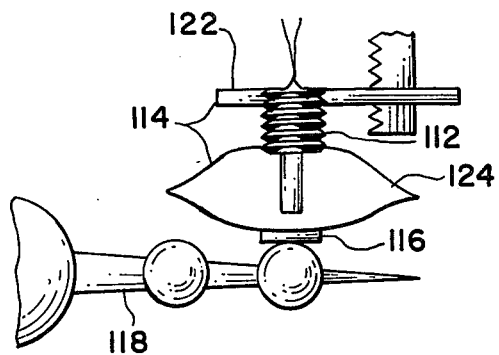
FIG. 2 is an elevational view depicting a pad target and a housing including a set of springs.

Another embodiment of the invention is depicted in FIG. 2. Housing 114 constitutes two parts. Top part 122 of housing 114 holds the probe as in the aforementioned embodiment. The lower part 124 of housing 114 is a set of springs which hold target 116 in contact with vibrating surface 118. The tension of springs 124 is such that target 116 is held away from probe 112. Target 116 and probe 112 are selected as described above. FIG. 2 demonstrates fotonic sensor 112 used in conjunction with reflective pad 116.

Figure 3:
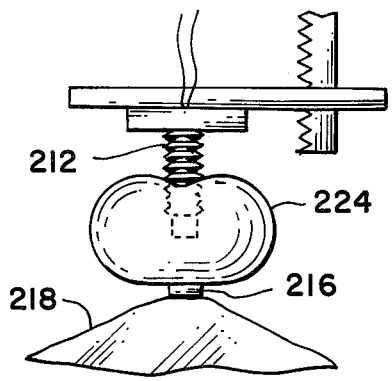
FIG. 3 is an elevational view depicting a pad target and a housing including a balloon.

Another manifestation of the invention in which inflated balloon 224 replaces the spring arrangement of the previous embodiment is shown in FIG. 3. Balloon 224 may be opaque and the inside surface thereof containing a reflecting target 216 for use with fotonic sensor 212 or any other target may be supported by the balloon for use with an appropriate sensor.

Figure 4:
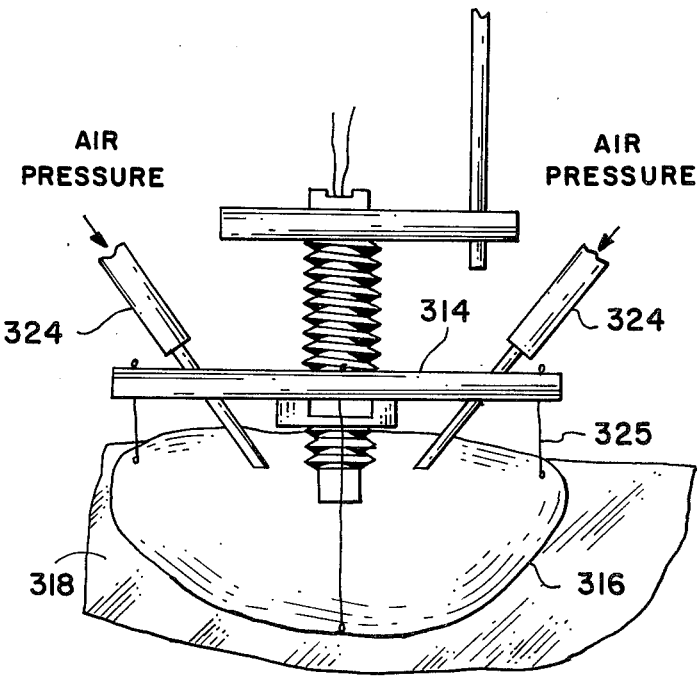
FIG. 4 is an elevational view depicting a housing including a set of nozzles for directing an airstream against the target.

Another embodiment of the invention is depicted in FIG. 4. Housing 314 holds probe 312 as in the earlier embodiments. Housing 314 also supports nozzles 324 which direct an airstream against target 316 to maintain the target's contact with the vibrating surface 318. Strings 325 give support to target 316 and limit the maximum distance between the target and the sensor.

Figure 5:
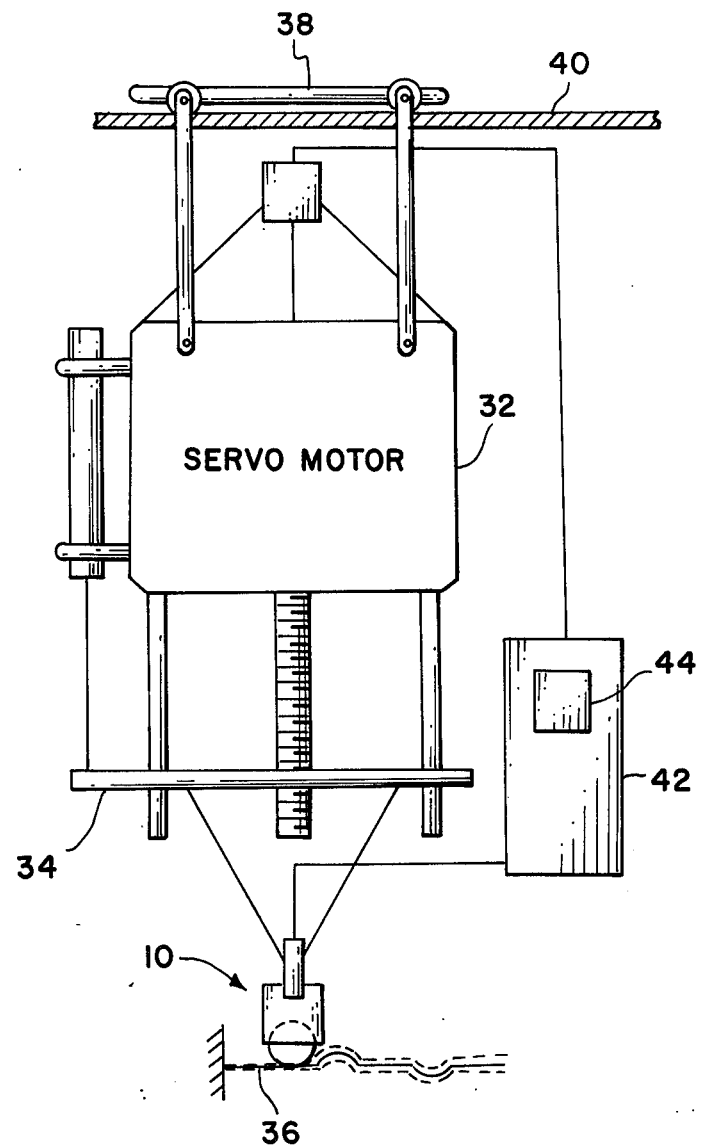
FIG. 5 is an elevational view depicting the servo motor system for transporting the probe across the surface of the vibrating structure.

A servo motor system moves the above described transducer up and down over the vibrating surface as the device is moved along the vibrating surface as is shown in FIG. 5. This system is completely described in U.S. Pat. No. 3,503,251 to Flagge and so only a brief description is contained herein. Transducer 10 is attached to servo motor 32 by any suitable assembly 34 so that the shaft of servo motor 32 determines the distance between transducer 10 and vibrating structure 36. Transporting carriage 38 supports servo motor 32 which moves along track 40. Electrical system 42 receives information from transducer 10 and controls servo motor 32.

OPERATION OF THE INVENTION

Referring again to FIG. 1, transducer 10 is positioned over vibrating surface 18 such that target 16 is in contact with surface 18. Probe 12 senses the distance between target 16 and itself. Target 16 vibrates with surface 18, thereby changing the distance between target 16 and probe 12 by an amount equal to the displacement of vibrating surface 18.

Transducer 10 moves along the surface of vibrating surface 36 by means of transporting carriage 38 and track 40 as shown in FIG. 5. A change in distance between transducer 10 and vibrating surface 36 due to irregularities in surface 36 will result in a signal to operational amplifier 44 which will cause servo motor 32 to reposition transducer 10 to its initial height above surface 36. Small deviation in distance due to the vibration of surface 36 rather than the contour thereof are screened by a low pass filter so transducer 10 will not vibrate with surface 36.

Thus, the invention makes it possible to use noncontacting probes on surfaces to which the probes do not respond without necessitating the affixation of targets to the surface.

It is to be understood that the specific descriptions of the invention and the several embodiments thereof contained herein are illustrative only and that the actual invention is not so limited. Changes in the illustrated features of the invention which are readily apparent to those skilled in the art in light of the above teachings and are within the spirit of the appended claims are intended to be included therein.

What is new and desired to be secured by Letters Patent of the United States is:

1. In a device for measuring the displacement of a vibrating surface, the combination comprising:
    a housing;
    probe means supported by said housing for sensing the vibration of an object;
    target means capable of moving along and in contact with a nonuniform surface for providing a uniform object whose vibrations are sensed by said probe means thus enabling the measurement of the vibrations of a nonuniform surface;
    means included in said housing for holding said target means in position between said vibrating surface and said probe means such that said target means contacts said vibrating surface so as to vibrate therewith; and means supporting said housing for automatically moving said housing and therefore said probe means and said target means along the contour of said vibrating surface.
2. A device as in claim 1 wherein:
    said means in said housing is a cylindrical member;
    said probe means is positioned within said cylindrical member at the top portion thereof, said probe means facing downward; and
    said target means is a ball contained within said cylindrical member, said ball having vertical mobility within said cylindrical member and being free to roll therein, said cylindrical member restricting said ball's horizontal mobility; said cylindrical member being tapered at the bottom portion thereof to keep said ball therewithin.
3. A device as in claim 1 wherein:
    said means in said housing is a spring member; and
    said target means is a pad attached to said spring member.
4. A device as in claim 1 wherein:
    said means in said housing is a balloon; and
    said target means is a pad attached to said balloon.
5. A device as in claim 1 wherein:
    said means in said housing is a jet stream of gas; and
    said target means is a pad.
6. A device as in claim 2, 3, 4, or 5 wherein:
    said probe means is a noncontacting probe sensitive to metallic vibrations; and
    said target means is composed of metal.
7. A device as in claims 2, 3, 4, or 5 wherein:
    said probe means in a fotonic sensor; and
    said target means is composed of a uniformly reflective material.

* * * * *